United States Patent [19]
Bergqvist

[11] 3,984,178
[45] Oct. 5, 1976

[54] DISCONTINUOUS WIDE-ANGLE OPTIC

[75] Inventor: Erik Arne Bergqvist, Karlskoga, Sweden

[73] Assignee: Aktiebolaget Bofars, Bofors, Sweden

[22] Filed: Mar. 17, 1975

[21] Appl. No.: 558,875

[52] U.S. Cl. .................................. 350/198; 350/202
[51] Int. Cl.² .................... G02B 13/06; G02B 17/00
[58] Field of Search ............. 350/198, 201, 202, 21

[56] References Cited
UNITED STATES PATENTS

| | | | |
|---|---|---|---|
| 2,638,033 | 5/1953 | Buchele et al. | 350/198 |
| 3,628,027 | 12/1971 | Brauss | 350/202 X |

FOREIGN PATENTS OR APPLICATIONS

| | | | |
|---|---|---|---|
| 1,204,643 | 9/1960 | France | 350/201 |

*Primary Examiner*—John K. Corbin
*Assistant Examiner*—Conrad Clark
*Attorney, Agent, or Firm*—Pollock, Vande Sande & Priddy

[57] ABSTRACT

A discontinuous wide-angle optic for use in a light receiver or transmitter comprises a partial spherical element having a planar boundary surface superposed on the base surface of a pyramidal facet reflector provided with a plurality of inclined facet surfaces, one for each of a plurality of directions of incidence of light passing through the spherical surface of said spherical element. When used in a light receiver, the spherical surface functions as a positive lens to cause entering light rays to converge toward one of the facet surfaces of the reflector for reflection therefrom into an image plane located at a diaphragm formed on a surface of said partial spherical element spaced from its said planar boundary surface. A light conductor in the form of a truncated pyramid is provided to limit the field of view, said light conductor being provided with the same number of facet surfaces as the facet reflector and the narrower end of said light conductor being placed in optical contact with said partial spherical element at said diaphragm. A light filter and light detector is disposed adjacent the wider end of the light conductor. When used as a light transmitter, a light emitter is placed adjacent the wider end of the light conductor to cause light to be reflected from the facet surfaces of the light conductor and reflector so as to leave the optic via said spherical surface.

7 Claims, 11 Drawing Figures

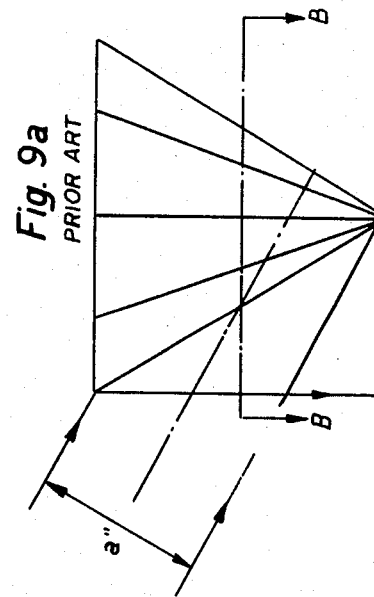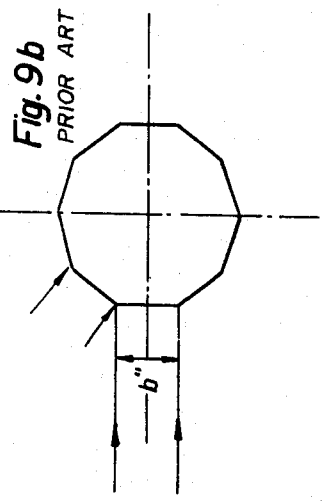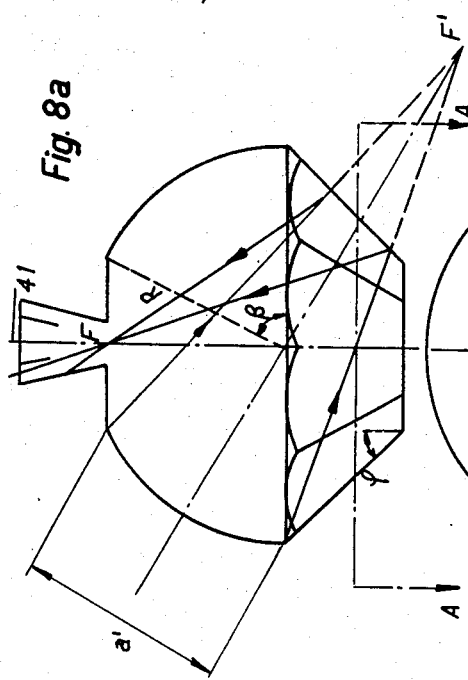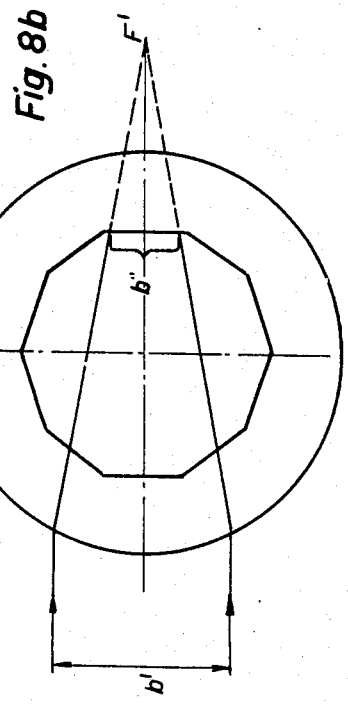

DISCONTINUOUS WIDE-ANGLE OPTIC

The present invention relates to a discontinuous wide-angle optic for a receiver for light which is placed in a given space, which inter alia is bounded by one or several windows or the like which permit incident light in the space from one or several directions of incidence against one and the same point on a center line allotted to the space and with the same angle in relation to said centre line. By light is meant, in the present case, optical radiation of all wavelengths for which the invention is transparent.

The present invention is particularly suitable for use within the fields of optics where a wide angle of view is preferred (which, however, need not be continuous,) as well as good optical filtering with interference filters. In order to fulfil these requirements it is necessary, among other things, that the ray divergency at some place in the optic does not exceed a certain value, and an interference filter is then installed in said place.

An example of such an application, with these requirements, is the one for optical proximity fuses. The proximity fuse scans e.g. a conical zone of the environment, and gives a signal if a foreign object is within this scanned zone, and in order for the proximity fuse to detect objects of all sizes, it is necessary that it has a continuous field of view around its axis in the longitudinal direction. It is then appropriate that the field of view be located within the envelope surfaces of two cones, of which the inner one has a smaller conical angle than the outer one. There is then a prominent desire that the limits (i.e., the envelope surfaces) of the scanned zone be distinct, so that the zone within which the proximity fuse is to give an indication of foreign objects can be predetermined with great precision.

In order to have the possibility of achieving the precision as regards the distinct limits that are desired, an imaging optical system is used, in which a diaphragm limiting the field of view is inserted in the picture plane. It has been found that an optical system that is to achieve a field of view which, as described above, covers the entire zone within the envelope surface of two cones, will have comparatively very little light intensity even if, to a major extent, parallel light is sacrificed through an optical filter.

As the objects to be detected by the proximity fuse usually have rather large dimensions in relation to the size of the fuse, it can very well be assumed that an object will be detected even if the zone is not continuous around the longitudinal axis of the proximity fuse, but instead consists of discrete lobes which extend uniformly within the previously described zone within the two conical envelope surfaces. This gives the advantage that each lobe can be dealt with as one unit, with uncomplicated and effective filtering and limitation of the field of view.

It has hitherto been proposed that for each lobe, at the outer surface of the proximity fuse, there should be arranged a lens, and inside of this there should be arranged a diaphragm for the field of view, a further lens and a filter, with the rays of light obtained from the filter being reflected on a facet surface, located on a facet reflector, to a signal-transmitting member in the form of a detector. In another prior arrangement that has been proposed, the light in the lobe in question has been allowed to fall in directly on the facet surface located in the facet reflector, from where it has been reflected to a lens, after which lens there have also been arranged, in the order mentioned, a diaphragm for the field of view, a further lens, and a filter from which the light is allowed to fall on a detector. From the examples mentioned of hitherto known devices it will be noted that the receiving area for each lobe is limited by the size of the lens used at the outer surface of the proximity fuse which, in other words, means that the diameter of the proximity fuze is a limiting factor for the receiving area.

The purpose of the present invention is to at least double the effective receiving area in each lobe, without having to reduce the number of lobes for a proximity fuse with a given diameter. The feature that can primarily be considered to characterize the discontinuous wide-angle optic of the present invention is that it has a spherical part placed on the base surface of a pyramidal facet reflector, the reflector being provided with a facet surface for each of the directions of incidence of the light. The spherical part and the reflector are arranged symmetrically around a center line, and the spherical part is also placed in such a way in relation to the direction of incidence of the light that its surface functions as a positive lens for the light from all directions of incidence, so that the light, through the inclinations given to the facet surfaces, is so focused that a picture plane is formed at a diaphragm for the field of view arranged at the spherical part.

An embodiment which has the characteristics significant for the invention will be described in more detail with reference to the accompanying drawings, in which FIG. 1 in perspective shows the appearance of a previously proposed scanning zone for a proximity fuze;

FIG. 2 in perspective shows how the proximity fuze with lobes senses parts of the scanning zone according to FIG. 1;

FIG. 3 in a side view shows a discontinuous wide-angle optic according to the invention;

FIG. 4 in a horizontal view taken on line 4—4 of FIG. 3 shows the wide-angle optic according to FIG. 3;

Figure 3:
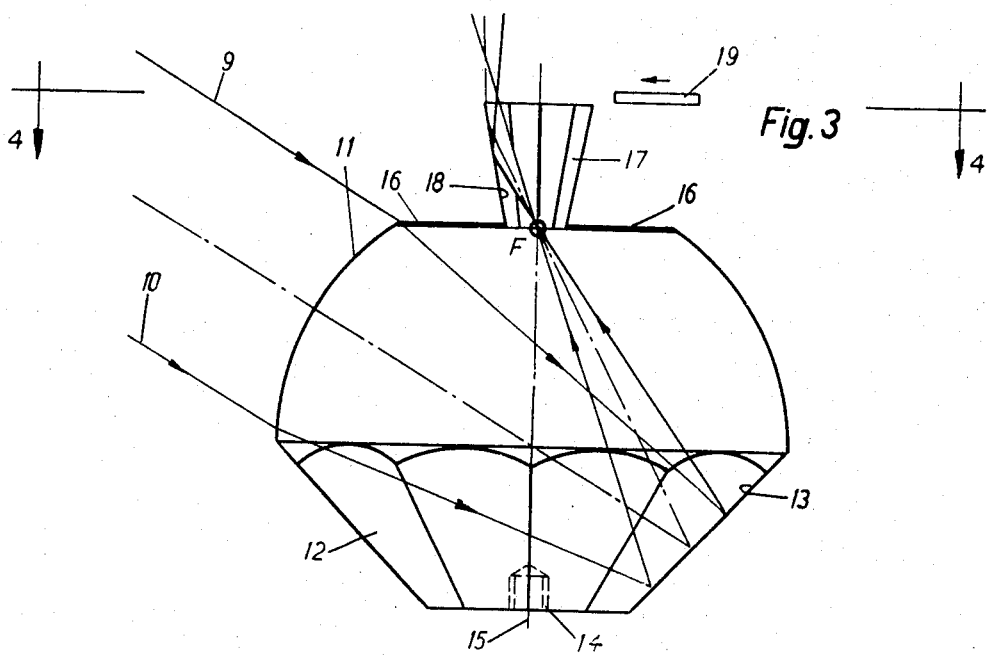
Figure 4:
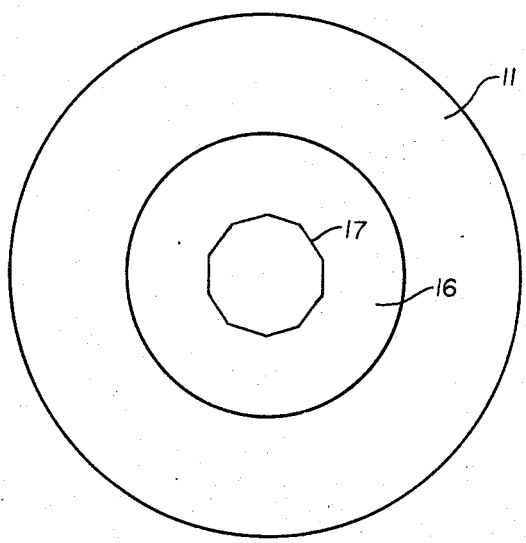
Figure 7:
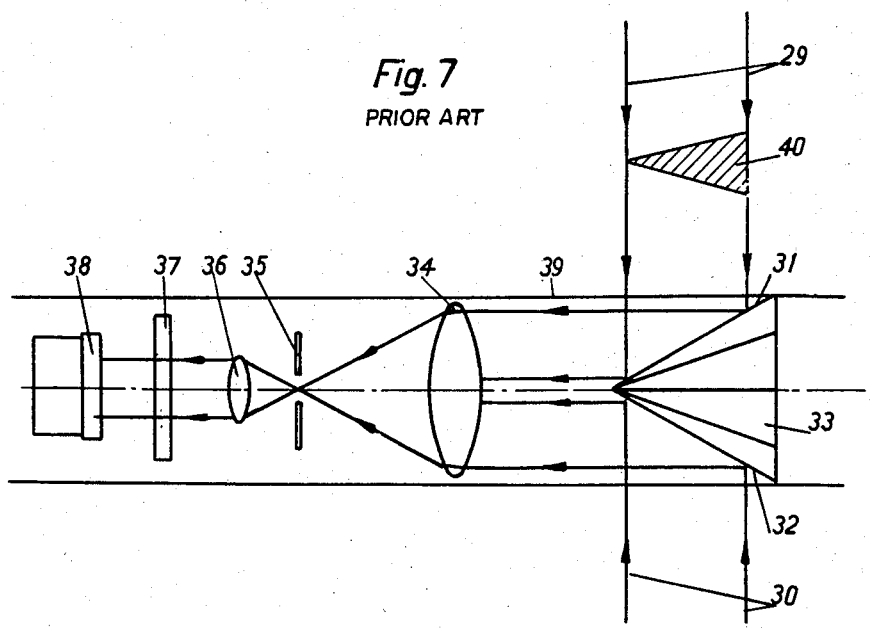
FIG. 7 shows schematically an arrangement hitherto used but different from the arrangement according to FIGS. 5 and 6 for receiving lobes of light according to FIG. 2.

FIG. 8a shows how a practical embodiment according to the wide-angle optic of FIGS. 3 and 4 is built up; and FIGS. 8a–8b and 9a–9b compare the functioning principles of the present invention (FIGS. 8a–8b) with the prior art arrangement shown in FIG. 7 (FIGS. 9a–9b), FIG. 8b being a section taken on line A—A of FIG. 8a and FIG. 9b being a section taken on line B—B of FIG. 9a of the present invention, FIG. 8b being a section taken on line A—A of FIG. 8a, and FIG. 9b being a section taken on line B—B of FIG. 9a.

Figure 1:
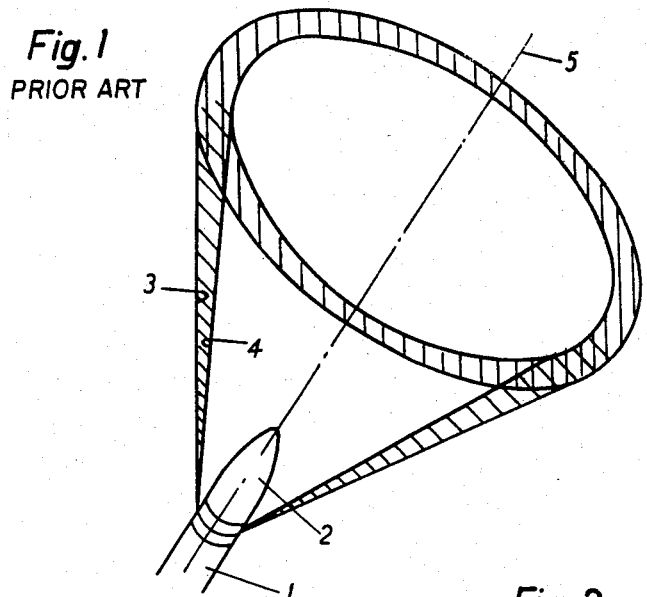

In FIG. 1, the reference numeral 2 depicts a known proximity fuse placed on a projectile 1. The proximity fuse scans a zone having an appearance, according to a prior art proposal, which is located between an inner surface 3 and an outer surface 4 of two cones with different point angles. The zone scanned is moreover arranged symmetrically around the line of symmetry 5 of the proximity fuze.

Figure 2:
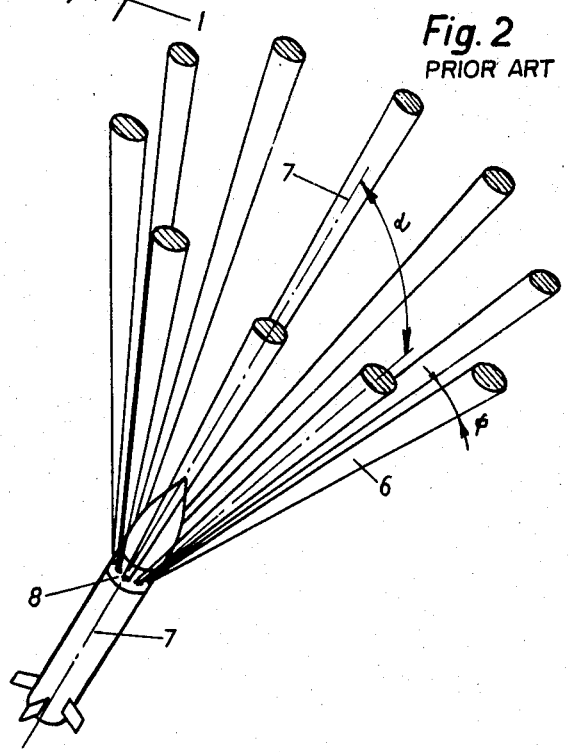

FIG. 2 shows how the prior art proximity fuse, when an imaging optical system is used, scans the environment with a number of lobes 6 which can be assumed to extend in the scanned zone according to FIG. 1. In order that the proximity fuze shall have the possibility of scanning as great a part of the zone according to FIG. 1 as possible, it is important to have a great number of lobes or directions of incidence for the light. The directions of incidence are symmetrically arranged around a center line for the fuze or the axis of symmetry 7 in the longitudinal direction of the proximity fuze, and are therefore all directed at an angle α towards a common point on said axis of symmetry 7, which point is located in the space 8 in the proximity fuze, and which space, in turn, is limited by one or several windows or the like which permit light to enter into the space in question. In the figure, the angle of each lobe is indicated as φ.

FIG. 3 shows light rays, designated 9 and 10, entering into the space from one of the directions of incidence. The discontinuous wide-angle optic of the present invention has a spherical part 11, directed towards the directions of incidence, which is placed on what can be regarded as the base surface of a pyramidal facet reflector 12, which in the example of the embodiment has been provided with ten faceted surfaces 13. Reflector 12 has moreover been truncated at its narrow end in order that, inter alia, a device 14 for fastening members can be applied, so that the optics can be fastened in a simple way in said space. The ten faceted surfaces 13 thus permit ten directions of incidence for the incident light. The spherical part 11 and the faceted reflector 12 are arranged symmetrically around an axis of symmetry 15 which, when the optic is placed in the proximity fuse, coincides with the line of symmetry 7 of the proximity fuse according to FIG. 2. The surface of the spherical part 11 functions as a positive lens for the incident light. The light is focused on the point F via a diaphragm 16 for the field of view after reflection from the particular facet surface 13 corresponding to the direction of incidence of rays 9-10 in question. The diaphragm 16 for the field of view is arranged at the upper surface of the spherical part 11, and has been coated with a light-absorbing material, which extends from the diaphragm for the field of view and outwards towards the edges of the upper surface. The dimensions of the glass member are calculated in such a way that objects at the maximum distance where discrimination is desired are clearly depicted in the picture plane 16.

At said diaphragm 16 for the field of view, a light conductor 17 is arranged, which light conductor has the form of a truncated pyramid, and which is placed with its narrow part against the upper surface 16 and on the part of said surface which is not covered by the light-absorbing material. The light conductor, with its narrow part, thus limits of the field of view. Furthermore, the light conductor 17 is provided with facet surfaces corresponding to each of the surfaces 13 of the facet reflctor, and in the example shown, a facet surface 18 in the light conductor 17 corresponds to the facet surface 13 in the reflector 12. By giving said reflecting surfaces 13, 18 in the reflector and the light conductor suitable inclinations in relation to each other, total reflection is obtained in the facet surface 18 of the light conductor 17, and the light in the direction of incidence in question will then fall with the least possible angle against an interference filter 19, appropriately mounted with optical contact with the wide part of the light conductor 17. After the filter 19 there is also a detector, not shown, which gives a signal if an object appears in the direction of incidence in question. The object can then be illuminated with a light-emitting device comprised in the source of light of the proximity fuse, which is the case for so-called active proximity fuses, or also the receiver of the proximity fuze detects e.g. IR radiation from the object, which is the case with so-called passive proximity fuses. In order to emphasize the technical effect obtained, in the following, a comparison will be made between previously known devices of this kind utilized for proximity fuses.

Figure 5:
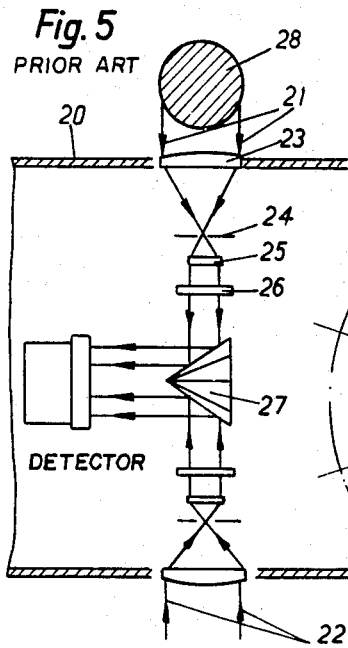
FIGS. 5 and 6 show schematically an arrangement hitherto used for receiving lobes of light according to FIG. 2.
Figure 6:
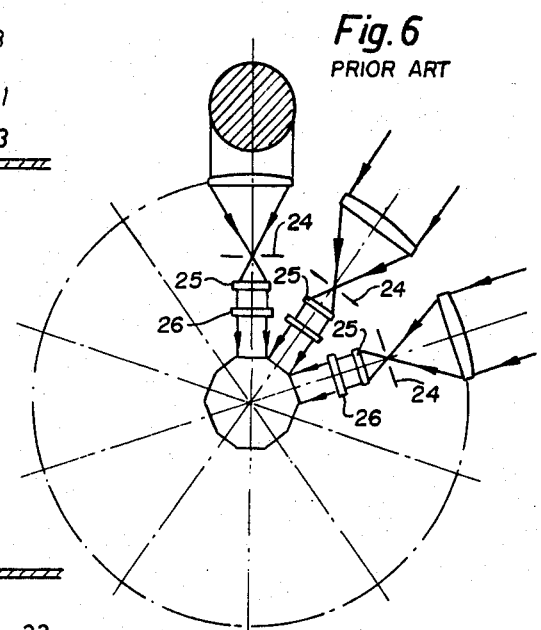

FIGS. 5 and 6 show an example of such a known device. The reference designation 20 shows the outer surface of the proximity fuse, and the optical units which receive light from two directions of incidence 21 and 22 are also shown. As the units which receive light from one direction of incidence are identical to the units that receive light from another direction of incidence, a discussion will be given here only of the units which receive light in the direction of incidence 21. At the outer surface 20 of the proximity fuse a positive lens 23 is arranged, which focuses the light into a diaphragm 24 for the field of view. Behind said diaphragm 24 a further lens 25 is arranged, in order to give parallel light through a filter 26, after which the light is reflected from a surface of a reflecting facet member 27 in the direction towards a detector which indicates a possible object in the direction of incidence 21 in question. A receiving zone obtained in the direction 21 is designated 28.

FIG. 7 shows another prior art device that differs from the embodiment according to FIGS. 5 and 6. The light in two directions of incidence is indicated with the numerals 29 and 30, and the light from each and every of all the directions falls against a facet surface corresponding to the direction of incidence e.g. 31 for 29 and 32 for 30, on a reflecting facet member 33.

In said facet surfaces the light is reflected to a lens 34 which focuses the light at a diaphragm 35 for the field of view, after which, as described above, the light is conducted through a further lens 36, in order to obtain parallel light, and a filter 37 to a detector 38. In the present case, a receiving zone obtained at the outer surface 39 of the proximity fuses is designated 40.

If the device according to the invention shown in FIG. 3 is now compared with e.g. the device according to FIG. 7, it will be found that, with respect to the reflecting surfaces 13 and 31 respectively, the light density is no less than four times as great at the surface 13 as at the surface 31. At the same time, however, the fact remains that only about half of the surface 13 is active compared with the surface 31, and therefore, the effect obtained is reduced, but in spite of this it amounts to at least the double (factor two).

The advantage of the optic according to the present invention compared with e.g. the reflector 33 according to FIG. 7 can also be illustrated schematically with the aid of FIGS. 8a - 8b and 9a - 9b.

In the figure plane for FIG. 8a, the ray of light falling into the optic of the present invention is assumed to have an extent of $a'$. The extent of the ray of light of a plane at right angles to the plane of FIG. 8a is moreover assumed to have a mean extent $b'$, shown in FIG. 8b, which mean extent is limited by the width of the facet surface. For a prior art facet reflector according to FIG. 9a, the value corresponding to $a'$ is designated $a''$, which values $a'$ and $a''$ are approximately equal for two devices of comparable size. The mean extent of the ray of light in a plane at right angles to the plane according to FIG. 9a is designated in FIG. 9b with $b''$, the value of which is somewhat less than one-half of the mean extent $b'$, which will be noted from the geometry in FIG. 8b. $F'$ is the virtual focus of the spherical surface.

From FIGS. 8a - 8b and 9a - 9b and from the above-mentioned discussion, it should be obvious that the receiving area for the optics of the present invention is $b'/b''$ times greater than the corresponding receiving area for the previously known device in question.

An example of a prism which functions well in practice is also shown in FIG. 8a. For the direction of incidence shown in the figure in relation to the axis of symmetry 41 it has been found that a radius of 22.5 millimeters can be chosen for the spherical part, while the height of the reflector is 15 mm and the total height of the reflector and the spherical part is 34.5 mm. The angle $\beta$ is 60°, and the angle $\phi$ is 45°. The material used is acrylic glass. Material with another refractive index can, of course, also be chosen, and other dimensions, angles, number of facet surfaces and the form of the light conductor can be varied. Moreover, the way in which the discontinuous wide-angle objective is built up will also be determined by the angle of the incident light.

A modification of the wide-angle objective according to the invention is characterized in that it is allowed to coact with a light-transmitting unit instead of a receiving unit in the form of a detector. The rays of light will then have a substantially opposite direction in the objective in relation to what has been described in the above-mentioned example of the embodiment, with the result that the light can be transmitted in one or several outgoing directions corresponding to the directions of incidence.

The invention is not limited to the embodiments herein described as examples, but can be subject to modifications within the scope of the following claims.

I claim:

1. A discontinuous wide-angle optic for a light receiver, said optic being located within a space which is bounded by a window structure operative to permit incident light rays to enter said space only in the form of discrete lobes which are oriented respectively at the same angles of incidence relative to a center line in said space, the directions of incidence of said discrete lobes intersecting one another at the same point on said center line in said space, said optic comprising an at least partially spherical element superposed on the base surface of a pyramidal facet reflector having a plurality of inclined facet surfaces, one facet surface for each of the directions of incidence of said discrete lobes, a diaphragm formed on the exterior of said spherical element at a location spaced from the base surface of said reflector, said spherical element and said pyramidal facet reflector each being arranged symmetrically around said center line, said spherical element being positioned in relation to all of the directions of incidence of said discrete lobes to functin as a positive lens for all of said lobes and operative to cause the light rays in each lobe entering said space through said window structure to converge toward one of the facet surfaces of said reflector for reflection therefrom, the inclinations of said facet surfaces being selected to focus said reflected light rays at an image plane located at said diaphragm.

2. The discontinuous wide-angle optic of claim 1 wherein said diaphragm is located on a flat upper surface of said spherical element, said flat upper surface being parallel to said base surface of said pyramidal facet reflector, said flat upper surface being coated with a light-absorbing material from the aperture in said diaphragm outwards towards the edges of said flat upper surface.

3. The discontinuous wide-angle optic of claim 2 including a light conductor, in the form of a truncated pyramid, placed on said upper surface, the narrower end of said light conductor being in optical contact with the uncoated part of said upper surface, whereby the light conductor limits the field of view.

4. The discontinuous wide-angle optic of claim 3 including a light filter disposed adjacent the wider end of said light conductor, said light conductor being provided with the same number of facet surfaces as the facet reflector, each facet surface on the light conductor corresponding to a facet surface on the reflector, the facet surfaces in each such pair of corresponding facet surfaces having an inclination in relation to each other such that light rays reflected from a facet surface of said reflector to pass through said diaphragm thereafter experience a total reflection from the corresponding facet surface of the light conductor and thereafter pass through said filter at the least possible angle to said center line.

5. The discontinuous wide-angle optic of claim 4 including a detector responsive to light passing through said filter operative to indicate if there is an object within the field of view.

6. The discontinuous wide-angle optic of claim 1 wherein said facet reflector is truncated to provide a narrow end surface opposite to said base surface, said narrow end surface including means for fastening the optic within said space.

7. The discontinuous wide-angle optic of claim 4 wherein said wide-angle optic is utilized in a transmitter of light, said light conductor coacting with a light-emitting unit whereby light emitted from said unit is reflected via the facet surfaces of the light conductor and the reflector to leave the optic via the spherical surface of said spherical element.

* * * * *